US006460098B1

(12) United States Patent
Paul

(10) Patent No.: US 6,460,098 B1
(45) Date of Patent: Oct. 1, 2002

(54) LOW VOLTAGE DIFFERENTIAL SCSI BUS INTERCONNECT SYSTEM HAVING REPEATER MEANS

(75) Inventor: Dieter G. Paul, Anaheim, CA (US)

(73) Assignee: StorCase Technology, Fountain Valley, CA (US)

(*) Notice: Subject to any disclaimer, the term of this patent is extended or adjusted under 35 U.S.C. 154(b) by 0 days.

(21) Appl. No.: 09/332,015

(22) Filed: Jun. 14, 1999

(51) Int. Cl.[7] ............................................. G06F 13/00
(52) U.S. Cl. .......................... 710/62; 710/63; 710/64; 710/72; 710/301; 710/305; 710/313; 710/314
(58) Field of Search ................................ 710/300–304, 710/62–64, 72, 305–315; 713/340; 364/708.1, 707; 439/296–298

(56) References Cited

U.S. PATENT DOCUMENTS

| 5,195,022 A | * | 3/1993 | Hoppal et al. ............... 361/391 |
| 5,515,515 A | * | 5/1996 | Kennedy et al. ............ 710/302 |
| 5,611,057 A | * | 3/1997 | Pecone et al. ............... 710/301 |
| 5,628,637 A | * | 5/1997 | Pecone et al. ................ 439/74 |
| 5,664,119 A | * | 9/1997 | Jeffries et al. ............... 710/302 |
| 5,726,922 A | * | 3/1998 | Womble et al. ........... 364/708.1 |
| 5,761,032 A | * | 6/1998 | Jones ........................... 361/685 |
| 5,778,254 A | * | 7/1998 | Ohstuka et al. ............... 710/72 |
| 5,819,104 A |   | 10/1998 | Tuccio |

* cited by examiner

Primary Examiner—Peter Wong
Assistant Examiner—Raymond N. Phan
(74) Attorney, Agent, or Firm—Morland C. Fischer

(57) ABSTRACT

Apparatus by which a maximum number (e.g. 16) of external high speed computer data storage devices (e.g. computer hard drives) that are housed within portable carriers can be efficiently connected to and concurrently operated from the same low voltage differential (LVD) SCSI bus of a host computer by eliminating the adverse effects (e.g. parasitic capacitance, impedance mismatch and signal distortion) that occur as a consequence of the stub length that is required to couple a data storage device to its SCSI bus. A U-shaped receiving frame is affixed to and enclosed by a chassis, and the portable carrier in which the data storage device is housed is slidably received in and removable from the receiving frame. An isolator board carrying a repeater chip is coupled to the backplane of the receiving frame so that the repeater chip is electrically connected between the SCSI bus and the data storage device within the portable carrier. The repeater chip receives the control and data signals from the host computer over the SCSI bus and repeats them with their original signal format and quality to the data storage device so that the SCSI controller believes that the data storage device is connected directly to the SCSI bus without interference from the cable stub length.

4 Claims, 3 Drawing Sheets

LOW VOLTAGE DIFFERENTIAL SCSI BUS INTERCONNECT SYSTEM HAVING REPEATER MEANS

BACKGROUND OF THE INVENTION

1. Field of the Invention

This invention relates to an apparatus by which a plurality of high speed external computer data storage devices (e.g. computer hard drives) that are housed within portable carriers can be effectively coupled to and operated from the same low voltage differential (LVD) SCSI bus of a host computer by means of electrically connecting a repeater chip to each of the data storage devices.

2. Background Art

Computer systems are known having a plurality of external data storage devices (e.g. computer hard drives). For low voltage operation, it is desirable that all of the data storage devices be connected directly to the low voltage differential (LVD) SCSI bus of a host computer. However, when the external data storage devices are housed within removable carriers (i.e. portable carriers that are adapted to be removed from a multi-bay chassis), problems have arisen when many of such high speed data storage devices are connected to and operated from the same bus. More particularly, system delay and signal error have been known to occur when more than two or three removable data storage devices are operating at the same time and at full speed (e.g. 80 MHz per second). Such problems are a consequence of signal distortion, impedance mismatches and parasitic capacitance that are inherently produced by the relatively long stub length that is commonly required for coupling a removable data storage device to its LVD SCSI bus.

Accordingly, it would be desirable to be able to overcome the aforementioned problems by making the stub length between an external data storage device and its LVD SCSI bus appear as short as possible to the SCSI controller so that many high speed data storage devices that are housed within respective removable carriers at different chassis can be efficiently coupled directly to the same bus and operated at full speed at the same time.

SUMMARY OF THE INVENTION

In general terms, apparatus is disclosed by which a maximum number (e.g. 16) of external computer data storage devices that are housed in respective removable carriers can be effectively coupled to and operated from the same low voltage differential (LVD) SCSI bus by eliminating the signal distortion that is introduced as a consequence of the relatively long stub lengths that are commonly required for connecting the external data storage devices in removable carriers to the bus. A chassis has a series of drive bays in which are stationed U-shaped receiving frames stacked one above the other. Each U-shaped frame accommodates a removable carrier within which an external computer data storage device (e.g. a hard drive, tape drive or the like) is housed. The data storage device is connected to the backplane at the rear of the U-shaped frame by way of the usual arrangement of connectors and cables that are commonly referred to as a stub length.

According to the present improvement, an isolator board is mated to the backplane at the rear of each U-shaped frame in the multi-bay chassis. The isolator board carries a repeater chip. With the removable carrier returned to its U-shaped receiving frame at a drive bay of the chassis, the repeater chip is electrically connected between the LVD SCSI bus and the external computer data storage device that is housed within the removable carrier, whereby to modularize a network having many data storage devices connected to the same LVD SCSI bus. The addition of a repeater chip connected to a data storage device avoids the adverse effects commonly caused by the stub length for coupling the storage device to its bus by making it appear to the SCSI controller that the stub length is infinitesimally short and that the data storage device is connected directly to the bus. The repeater chip causes all of the data and control signals transmitted to the data storage device over the LVD SCSI bus to be repeated (i.e. started over at the isolator board with their original signal format and quality) as to avoid signal distortion or loss and make it is possible to efficiently operate as many as sixteen different data storage devices at full speed from the same LVD SCSI bus.

DETAILED DESCRIPTION

Figure 1:
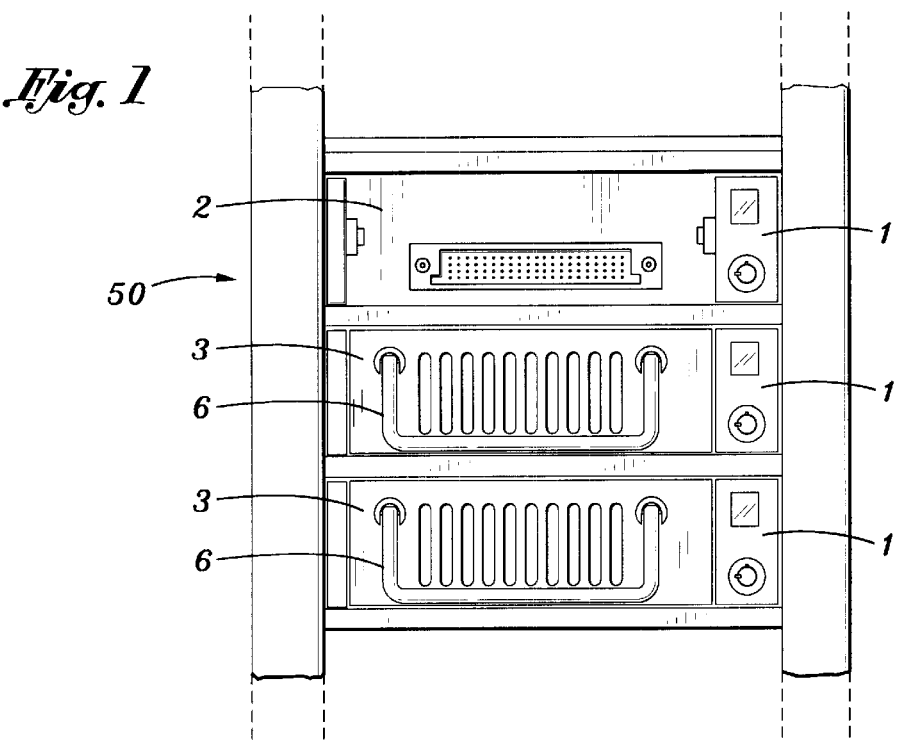
FIG. 1 shows a multi-bay chassis having U-shaped receiving frames stacked one above the other to accommodate removable carriers in which external computer data storage devices are housed.
Figure 2:
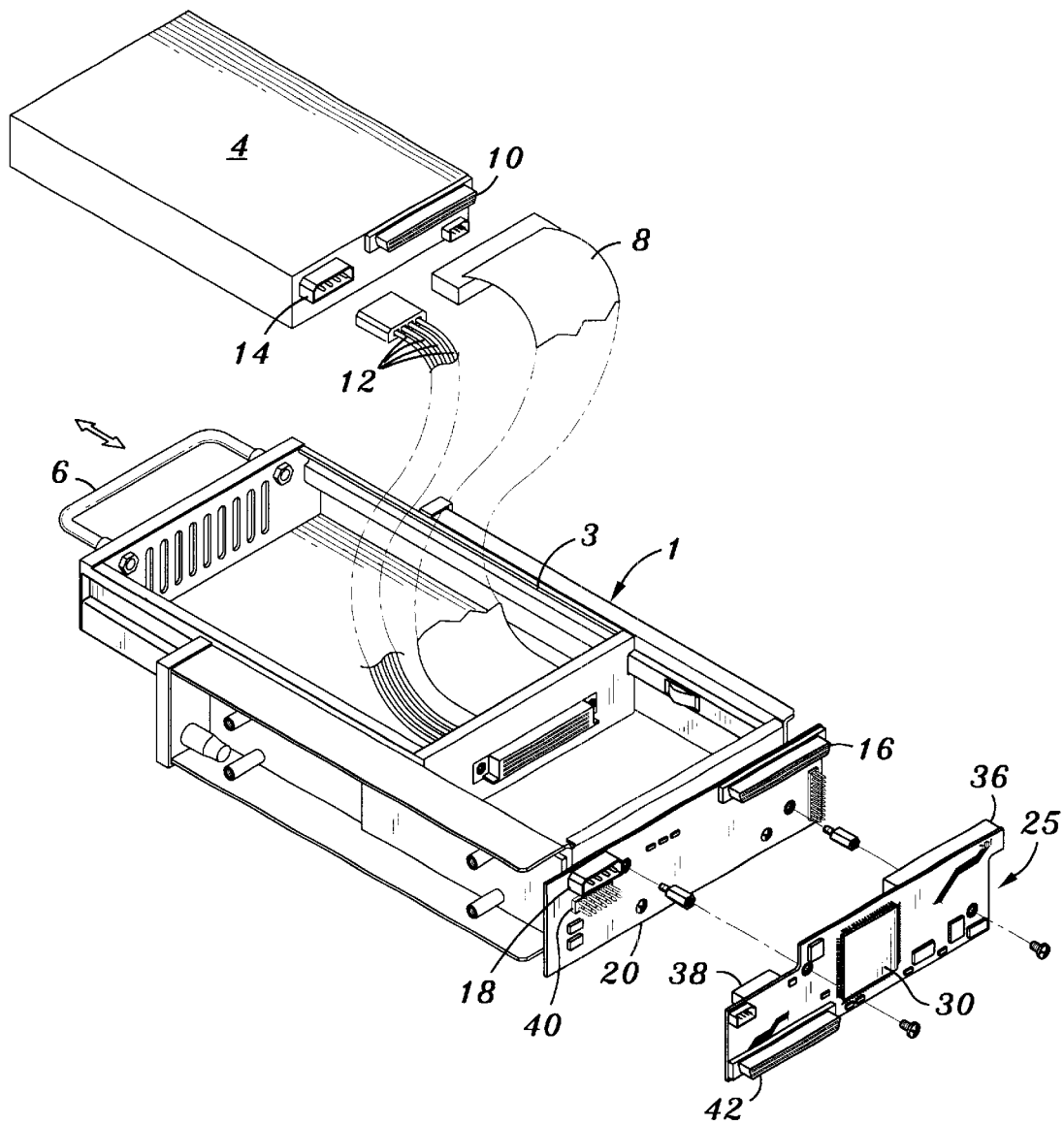
FIG. 2 is an exploded view showing a U-shaped frame taken from the chassis of FIG. 1, a removable carrier to be received by the frame, the data storage device housed by the carrier, and an isolator board to be mated to the backplane of the frame.

FIG. 1 of the drawings shows a metal chassis 50 which is adapted to accommodate a plurality of (e.g. nine) U-shaped receiving frames 1 that are stacked one above the other within respective drive bays 2 of the chassis. As shown in FIG. 2, each U-shaped frame 1 surrounds a portable carrier 3 which is slidably received by and removable from the frame 1 of chassis 50. An external data storage device 4, to be interfaced with a host computer (e.g. a personal computer, work station, or like) via a low voltage differential (LVD) SCSI bus, is housed within the removable carrier 3. The external data storage device 4 is conventional and may be a commercially available computer disk drive, tape drive, etc. Each removable carrier 3 for a data storage device 4 has a handle 6 attached to the front thereof to which a pulling force is applied to cause the carrier 3 to be withdrawn from its frame 1 at a respective drive bay 2 of chassis 50 and transported from place-to-place. For example, it may be desirable to transport the removable carrier 3 to a different chassis at a remote location or to hold the carrier 3 at a secure location to restrict access to the contents of the data storage device 4 thereof The details by which the carrier 3 is removably received by its U-shaped frame 1 are well known to those skilled in the art and will not be described herewithin. By way of example only, a removable carrier for an external data storage device, such as that illustrated in the drawings, is available from the DE100 product line of removable device enclosures manufactured by Kingston Technology Company of Fountain Valley, Calif.

As is best shown in FIG. 2, a stub length connector 10 from the external data storage device 4 within the removable carrier 3 is coupled to conventional ribbon cable 8 that runs between storage device 4 and a corresponding connector (not shown) at the rear of the removable carrier 3. In this same regard, wires 12 run from a power connector 14 of data storage device 4 to a corresponding connector (also not shown) at the rear of carrier 3. As will be known to those skilled in the art, the ribbon cable 8 and wires 12 for coupling the external data storage device to its LVD SCSI bus through the backplane 20 of removable carrier 3 are commonly known as a stub length.

With the carrier 3 received within and mated to its U-shaped frame 1, the connectors 10 and 14 of external data storage device 4 will be electrically coupled to a backplane bus connector 16, a DC power connector 18 and a control signal interface connector 40 that provides power to a soon to be described isolator board 25. Each of the connectors 16, 18, 40 and 44 is mounted on and accessible at the backplane 20 (e.g. a printed circuit board) that is secured to the rear of the U-shaped frame 1. In this fashion, the external data storage device 4 affixed to carrier 3 will be able to communicate with the host computer to receive and transmit input and output computer interface signals, power and control signals, data signals and address selection signals in the usual manner.

Figure 3:
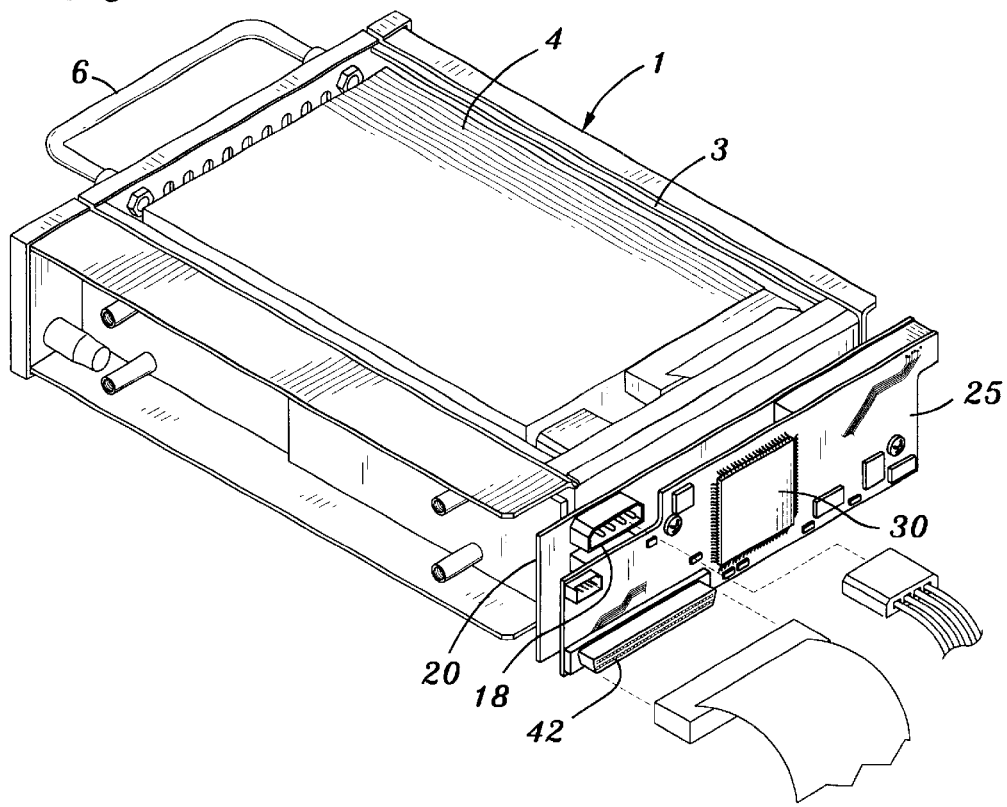
FIG. 3 shows the assembled configuration of the U-shaped frame, carrier and isolator board of FIG. 2.

In accordance with the present improvement, an isolator board 25 having a repeater chip 30 is connected to each of the U-shaped frames 1 that are located within the drive bays 2 of the chassis 50 of FIG. 1 so that each repeater chip 30 is connected between the LVD SCSI bus and the data storage device 4 housed by a carrier 3. As is best shown by FIG. 3, the isolator board 25 is mated to the backplane 20 at the rear of U-shaped frame 1. More particularly, the isolator board 25 has a pair of screw holes 32 formed therein, and the backplane 20 has a pair of cylindrical, screw threaded posts 34 that are aligned with respective holes 32. Screws 37 are inserted through the screw holes 32 for receipt by the threaded posts 34. The posts 34 enable the secure attachment of isolator board 25 to backplane 20 while maintaining a desired spacing of the isolator board 25 from the backplane 20.

Figure 4:
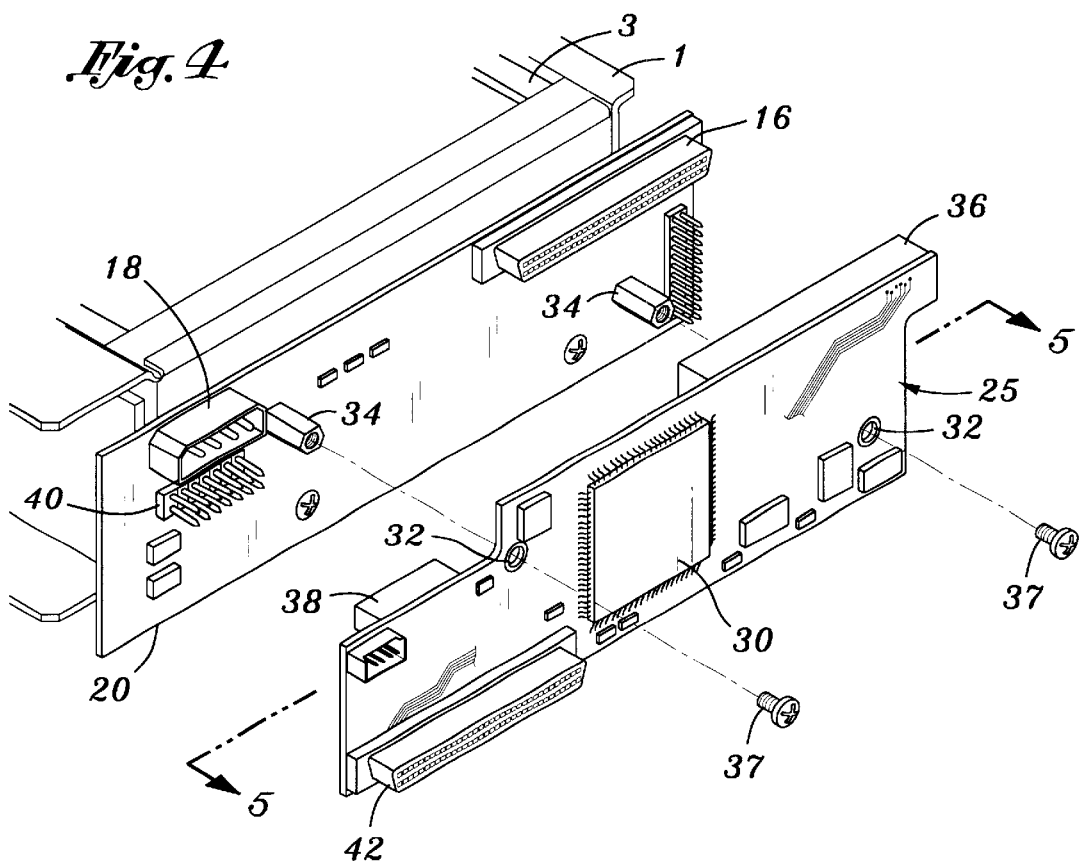
FIG. 4 shows one side of the isolator board of FIG. 3 to which a repeater chip is connected.
Figure 5:
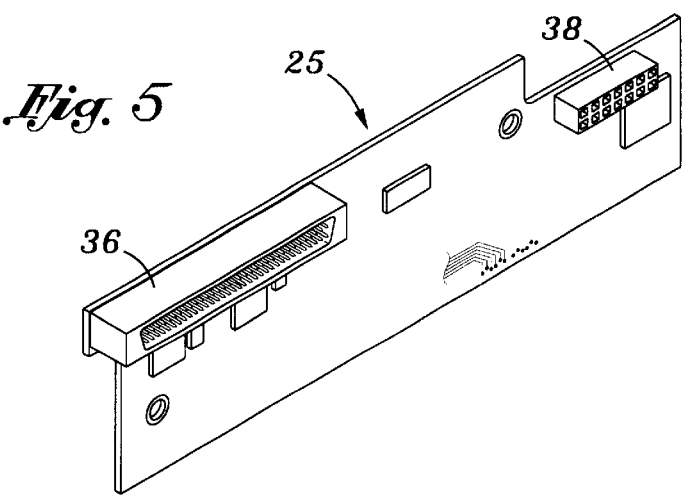
FIG. 5 shows the opposite side of the isolator board of FIG. 4.

Referring now to FIGS. 4 and 5 of the drawings, the back of the isolator board 25 carriers coupling connectors 36 and 38. In the assembled configuration shown in FIG. 3, the isolator board 25 is electrically connected to the backplane 20 of U-shaped frame 1 and to the data storage device 4 within carrier 3 by means of the coupling connectors 36 and 38 at the back of isolator board 25 being mated to complementary connectors 16 and 40 at the front of backplane 20.

With the isolator board 25 mechanically and electrically connected to the backplane 20 of the frame 1 as described above and as shown in FIG. 3, an SCSI bus connector 42 is located at the front of isolator board 25 for connection between the LVD SCSI bus and the removable data storage device 4 by way of the backplane connector 16 and coupling connector 36. With the coupling connector 38 of isolator board 25 connected to the control signal interface connector 40 of backplane 20 and the DC power connector 18 of backplane 20 connected to a suitable source of DC power, power will be supplied to the isolator board 25 to activate the repeater chip 30.

The repeater chip 30 carried by the isolator board 25 is, for example, a 53C140 chip manufactured by Symbios Corporation. The advantage of a repeater chip 30 being electrically connected to each of the U-shaped frames 1 that are stacked one above the other within the drive bays 2 in the chassis 50 of FIG. 1 is that with the removable carriers 3 returned to their drive bays 2, a network having many external data storage devices connected to a LVD SCSI bus can be modularized. The addition of isolator board 25 having repeater chip 30 makes the SCSI controller believe that the data storage device 4 within removable carrier 3 is connected directly to the LVD SCSI bus so as to ignore all of the stub lengths between data storage device 3 and the SCSI bus connector 42 of isolator board 25, whereby to avoid the adverse effects inherently caused by the presence of such stub lengths. That is to say, parasitic capacitance, impedance mismatches and signal distortions that are typically caused by the stub length signal path between the data storage device 4 and the backplane bus connector 16 of a conventional removable carrier without the isolator board 25 of this invention are now eliminated to enable the LVD SCSI bus to operate at its maximum speed.

The repeater chip 30 of isolator board 25 causes all of the control and data signals that are carried over the LVD SCSI bus to the SCSI bus connector 42 to be repeated (i.e. started over again at the isolator board 25 with their original signal format and quality). By virtue of the foregoing, it will now be possible to eliminate signal distortion so that a maximum number (e.g. 16) of data storage devices (instead of two or three) can be connected to and operated at high speed at the same time from the same bus. Of course, he actual number of data storage devices that can now be coupled to the same LVD SCSI us will depend upon capabilities and characteristics of the bus.

It may be appreciated that although repeater chips have been used in the past, the usual function of such a chip is merely to clean up the signals on an LVD SCSI bus. In the conventional case, a single repeater chip is associated with the signal input of a chassis so that two or three high speed external data storage devices can be operated at full speed the same time off the same bus. However, it has not been known to use repeater chips in applications involving external data storage devices with removable carriers as has been disclosed above so that the number of storage devices that are coupled to the same LVD SCSI bus and operated at the same time can be maximized, depending upon the capabilities of the bus.

Although the isolator board 25 on which the repeater chip 30 is mounted has been described above with regard to a relatively long stub length between a data storage device and the backplane of the receiving frame, it is to be understood that the isolator board 25 could also be interfaced with a removable carrier having a short stub length or no stub length at all. In this case, the number of high speed data storage devices that can be coupled to the LVD SCSI bus may still be maximized from approximately nine storage devices, prior to the addition of isolator board 25, to approximately 16 devices, depending upon the capabilities of the bus.

I claim:

1. In combination:

a chassis having a plurality of frame receiving bays;

a corresponding plurality of carrier frames located within said plurality of frame receiving bays, each of said carrier frames having a backplane and an SCSI bus connector located at said backplane and coupled to an SCSI bus;

a plurality of external data storage devices to be interfaced with a host computer over the SCSI bus in order to receive control and data signals from the host computer;

a plurality of portable carriers within which to house respective ones of said plurality of external data storage devices, said plurality of portable carriers being slidably received by and removable from said plurality of carrier frames that are located within said plurality of frame receiving bays of said chassis so that the SCSI bus connectors located at the backplanes of said carrier frames communicate with said plurality of external data storage devices housed within said plurality of portable carriers; and a signal repeater located at the backplane of each of said plurality of carrier frames so as to be electrically connected between the SCSI bus and the SCSI bus connector at said backplane, said signal repeaters on said carrier frames receiving the control and data signals from the host computer over the SCSI bus and repeating said control and data signals to said plurality of external data storage devices by way of the SCSI bus connectors.

2. The combination recited in claim 1, wherein each of said plurality of external data storage devices to be interfaced with the host computer is a computer hard drive.

3. The combination recited in claim 1, wherein each signal repeater is located on a circuit board, each of said circuit boards being mounted on the backplane of one of said plurality of carrier frames, such that said signal repeater is electrically connected between the SCSI bus connector at said backplane and the SCSI bus.

4. The combination recited in claim 3, wherein each circuit board on which said signal repeater is located has first and second coupling connectors, the first coupling connector to couple the SCSI bus to said signal repeater and the second coupling connector to couple said signal repeater to the external data storage device within said portable carrier via the SCSI bus connector located at the backplane of the frame in which said portable carrier is slidably received.

* * * * *